United States Patent
Hoshino et al.

(10) Patent No.: US 7,438,754 B2
(45) Date of Patent: Oct. 21, 2008

(54) COBALT-CONTAINING BLACK PIGMENT PARTICULATES

(75) Inventors: Tomoyuki Hoshino, Tamano (JP); Koichi Katsuyama, Tamano (JP); Shoichi Fujiyasu, Tamano (JP); Takashi Nakashima, Tamano (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 11/662,733

(22) PCT Filed: Sep. 16, 2005

(86) PCT No.: PCT/JP2005/017150

§ 371 (c)(1),
(2), (4) Date: Mar. 14, 2007

(87) PCT Pub. No.: WO2006/030896

PCT Pub. Date: Mar. 23, 2006

(65) Prior Publication Data

US 2008/0075653 A1 Mar. 27, 2008

(30) Foreign Application Priority Data

Sep. 17, 2004 (JP) .............................. 2004-272609
Oct. 25, 2004 (JP) .............................. 2004-309171

(51) Int. Cl.
  *C01G 51/04* (2006.01)
  *C01G 1/02* (2006.01)
  *C09C 1/00* (2006.01)

(52) U.S. Cl. .................................. 106/480; 423/594.19

(58) Field of Classification Search .................. 106/480; 423/594.19

See application file for complete search history.

(56) References Cited

U.S. PATENT DOCUMENTS

| 5,968,248 | A * | 10/1999 | Shibasaki et al. ............ 106/439 |
| 7,014,701 | B2 * | 3/2006 | Stewart et al. ............... 106/480 |
| 2007/0103075 | A1 * | 5/2007 | Kim et al. .................... 313/582 |

FOREIGN PATENT DOCUMENTS

| JP | 8-208238 | | 8/1996 |
| JP | 9-22692 | | 1/1997 |
| JP | 10-324523 | | 12/1998 |
| JP | 2000-162643 | | 6/2000 |
| JP | 2002-68750 | | 3/2002 |
| JP | 2002-114521 | A * | 4/2002 |
| JP | 2003-138160 | | 5/2003 |

OTHER PUBLICATIONS

Machine Translation of Japanese Patent Specification No. JP08-208238A (Aug. 1996).*
Machine Translation of Japanese Patent Specification No. JP2002-68750A (Mar. 2002).*
Machine Translation of Japanese Patent Specification No. JP2003-138160A (May 2003).*

* cited by examiner

*Primary Examiner*—Anthony J Green
(74) *Attorney, Agent, or Firm*—Young & Thompson

(57) ABSTRACT

Disclosed is a black pigment having adequate degree of blackness and high electrical resistance at the same time. Specifically disclosed is a granular black pigment containing cobalt which is characterized in that it is composed of an oxide containing at least cobalt and the divalent cobalt content accounts for 40-70% of the total cobalt content. It is preferable that the total cobalt content in a whole particle is 60-80% by mass, and the divalent cobalt content in a whole particle is 20-50% by mass. It is also preferable that the primary particle diameter is 0.02-0.6 μm.

13 Claims, 1 Drawing Sheet

COBALT-CONTAINING BLACK PIGMENT PARTICULATES

TECHNICAL FIELD

This invention relates to cobalt-containing black pigment particulates and more particularly cobalt-containing black pigment particulates characterized by containing divalent cobalt in a specific proportion relative to the total cobalt content, which has high blackness and high electrical resistance and is particularly useful in color compositions for forming a black matrix, or a black electrode or a light shield layer of plasma displays, plasma addressed liquid crystal displays, etc.

BACKGROUND ART

Black pigments used in coatings, inks, toners, rubbers/plastics, and so on are required to be excellent in characteristics such as blackness, hue, tinting strength, and is hiding power and yet inexpensive. Carbon black, iron oxide-based pigments typified by magnetite, and complex oxide-based pigments have been employed according to the use.

Typical examples of black pigments mainly comprising a metal oxide include particulates of single-metal oxides, such as manganese oxide and copper oxide, and complex oxides of these metal elements.

As disclosed in JP 2000-162643A, a light shield in black-matrix-on-array type plasma displays and plasma addressed liquid crystal displays is required to have high electrical resistance to prevent electrical conduction between electrodes, so is the black pigment used to form the light shield as a matter of course. However, a black pigment exhibiting both good blackness and high electrical resistance has not been proposed as yet.

A few types of cobalt oxide particulates have been proposed as a battery material (see JP 10-324523A and JP 9-22692A). JP 10-324523A discloses wet-process reacted tricobalt tetroxide particulates or a mixture of the tricobalt tetroxide particles and cobalt oxyhydroxide particles. JP 9-22692A discloses platy tricobalt tetroxide particulates. These cobalt oxides are produced for use as a battery material and are unsatisfactory in terms of blackness and high electrical resistance.

DISCLOSURE OF THE INVENTION

An object of the present invention is to provide cobalt-containing black pigment particulates that settle the problems associated with the above-described conventional techniques.

The present invention provides a material with good blackness and electrical resistance sufficient for use as black pigment in black electrodes or light shield layers of plasma displays, plasma addressed liquid crystals, and the like.

The object of the invention is accomplished by the provision of a black pigment comprising an oxide which contains at least cobalt and has a divalent cobalt content of 40% to 70% based on the total cobalt content.

BEST MODE FOR CARRYING OUT THE INVENTION

Figure 1:
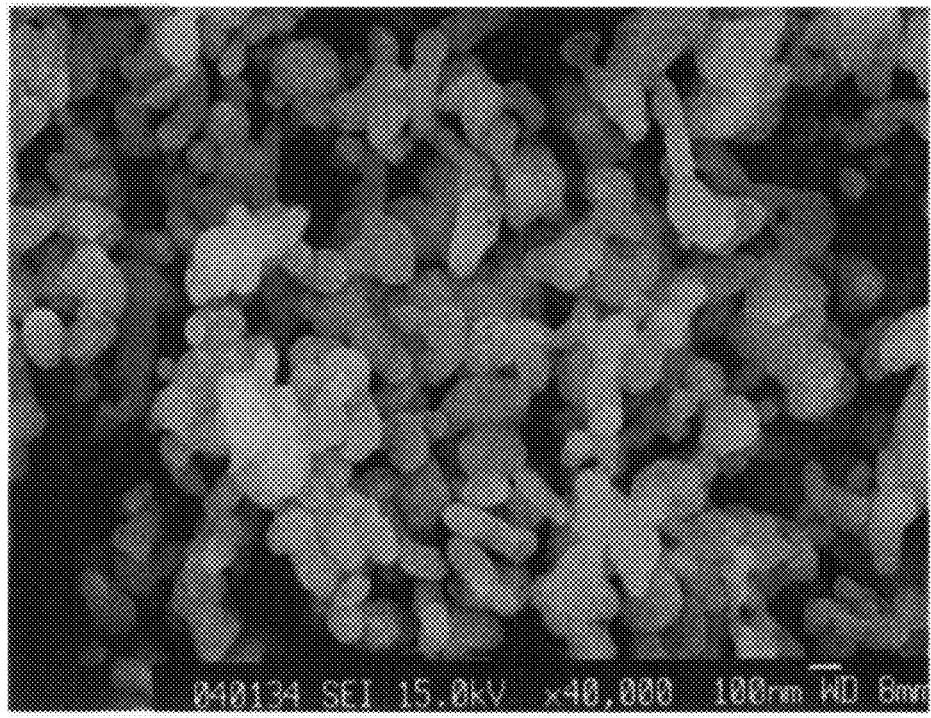
FIG. 1 is a SEM photograph of the cobalt-containing black pigment particulates obtained in Example 1.

The present invention will be described with reference to its preferred embodiments.

The cobalt-containing black pigment particulates according to the invention are black particulates mainly comprising an oxide containing at least cobalt and optionally containing one or more elements selected from Si, Al, Mn, Ni, Zn, Cu, Mg, Ti, Zr, W, Mo, P, etc. according to any characteristics desired.

It is important for the cobalt-containing black pigment particulates of the invention to have a divalent cobalt content of from 40% to 70% based on the total cobalt content. The percent (by mass) of a divalent cobalt content based on the total cobalt content (by mass) is a value (%) obtained by dividing the divalent cobalt content present in the entire particulates by the total cobalt content present in the entire particulates and multiplying the quotient by 100. Cobalt oxides generally take on such forms as tricobalt tetroxide ($Co_3O_4$), cobalt oxides (CoO and $Co_2O_3$). Divalent cobalt (cobalt (II)) is present in $Co_3O_4$ in a proportion of 33% relative to the total cobalt. Cobalt in CoO is 100% divalent. Cobalt in $Co_2O_3$ is 100% trivalent. The proportion of divalent cobalt relative to the total cobalt in the cobalt-containing black pigment particulates of the invention differs from that of any of these cobalt oxides. The recited specific elementary constitution of the black pigment of the invention has accomplished for the first time both blackness and high electrical resistance, the advantages of the present invention. If the divalent cobalt content is less than 40% based on the total cobalt content, the blackness is insufficient. If it exceeds 70%, the pigment will not be black but bluish green, failing to enjoy the effects of the invention. A still preferred divalent cobalt content based on the total cobalt content is 40% to 60%.

It is also important for the cobalt-containing black pigment of the invention to be a particulate form. Particles of other shapes such as a platy shape are inferior in dispersibility and fluidity. More than that, platy particles can have a thickness of about several tens of nanometers and cause nonuniformity of light absorption wavelength, which results in poor hue as a black pigment. Such a black pigment is unsuitable for use in black electrodes or light shield layers for plasma displays and plasma addressed liquid crystal displays. The terminology "a particulate form" as used herein is intended to mean having a spherical, a spindle or a like shape except a platy shape etc.

The cobalt-containing black pigment particulates of the invention preferably have a total cobalt content of 60% to 80% by mass based on the entire particulates. The divalent cobalt content based on the entire particulates is preferably 20% to 50% by mass. Theoretically, the total cobalt content in the entire particulates does not fall below 60% by mass. Presence of a large quantity of other elements than cobalt is unfavorable, for such can adversely affect the blackness or resistance. When the total cobalt content is more than 80% by mass, it is difficult to keep the balance of charge between cobalt and oxygen, and the product tends to lack in, stability. When the divalent cobalt content is less than 20% by mass based on the entire particulates, the blackness tends to be insufficient. When it is more than 50% by mass, too, the blackness is apt to be insufficient. The divalent cobalt content based on the total cobalt content is still preferably 65% to 75% by mass. The divalent cobalt content based on the whole particulates is still preferably 25% to 45% by mass.

The cobalt-containing black pigment particulates of the invention preferably have a primary particle size of 0.02 to 0.6 μm. The particulates with a primary particle size smaller than 0.02 μm assumes a reddish tint and have poor dispersibility. The particulates with a primary particle size greater than 0.6 μM have a satisfactory hue but are liable to suffer from such problems as insufficient tinting strength. A still preferred primary particle size is 0.05 to 0.3 μm in view of balance between hue and tinting strength.

The cobalt-containing black pigment particulates of the invention preferably have an L value of 38 or smaller and a b value of 0 or smaller in a test for tinting strength evaluation. A test for tinting strength evaluation is carried out as follows.

To a mixture of 0.5 g of black particulates and 1.5 g of titanium oxide (R800 available from Ishihara Sangyo Kaisha, Ltd.) is added 1.3 cc of castor oil, and the mixture is kneaded in a Hoover automatic muller. To 2.0 g of the blend is added 4.5 g of a lacquer, followed by further kneading. The resulting material is applied to mirror-finished coated paper with a 4-mil applicator, dried, and measured for blackness (L value) and hue (a value and b value) with a color analyzer (Color Analyzer TC-1800 available from Tokyo Densyoku Co., Ltd.). When the L value is greater than 38, the pigment cannot be seen as having sufficient tinting strength. The b value greater than 0 means that the hue is yellowish. The L value representing blackness is still preferably 36 or smaller, and the b value representing hue is still preferably –0.5 or smaller.

The cobalt-containing black pigment particulates are characterized by its high electrical resistance. Specifically, it preferably has an electrical resistivity of $1\times10^5$ Ωcm or higher. When an electrical resistivity is lower than $1\times10^5$ Ωcm, the functions as a material of forming a black-matrix-on-array type light shield cannot be seen as sufficiently high. The electrical resistivity is still preferably $5\times10^5$ Ωcm or higher, even still preferably $1\times10^6$ Ωcm or higher.

A preferred process of producing the cobalt-containing black pigment particulates of the invention will then be described. The cobalt-containing black pigment particulates of the invention are easily produced by the following method. First, a cobalt (II) salt is neutralized with an alkali hydroxide containing an alkali metal salt at a liquid temperature of 40° C. or lower to form cobalt (II) hydroxide while continuously bubbling the slurry with an inert gas. Then, the resulting cobalt (II) hydroxide is collected by filtration, washed, dried, deagglomerated, and fired at 400° to 800° C. to obtain the cobalt-containing black pigment particulates.

In the process, an aqueous solution containing a cobalt (II) salt as a main component is neutralized by mixing with an alkali hydroxide aqueous solution containing an alkali metal salt to produce cobalt (II) hydroxide. It is important that an inert gas should be bubbled continuously through the slurry during the neutralization reaction. Unless the slurry is bubbled with an inert gas, part of the cobalt (II) hydroxide in the slurry will be oxidized to cobalt (III) hydroxide with dissolved oxygen in the slurry or oxygen absorbed from the liquid surface. It follows that the resulting cobalt-containing black pigment particulates have a reduced divalent cobalt content. In other words, it is necessary to maintain such conditions as to minimize the cobalt (III) hydroxide formation in the slurry. Examples of the inert gas include nitrogen, helium, and argon.

The cobalt (II) in the process is preferably in the form of a water soluble salt, such as cobalt (II) sulfate, cobalt (II) chloride, and cobalt (II) nitrate. As an alkali, an alkali hydroxide aqueous solution containing an alkali metal salt, such as sodium hydroxide or potassium hydroxide, is used.

Cobalt (II) hydroxide is formed at a pH of 9 or higher. But, to ensure production of the cobalt-containing black pigment particulates of the invention, the pH of the slurry is preferably 11 to 13. There is a tendency that the cobalt (II) hydroxide formed at a pH lower than 11 is very fine particulates, which have poor filterability or may be sintered among themselves when fired. At a pH higher than 13, the formed cobalt (II) hydroxide is susceptible to oxidation even when the slurry is bubbled with an inert gas.

The cobalt (II) hydroxide formation is preferably carried out by bringing into uniform contact and uniformly mixing proper amounts of an aqueous solution containing a cobalt (II) salt as a main component and an alkali hydroxide aqueous solution containing an alkali metal salt. Because it is difficult to achieve uniform contact and mixing simply by free fall, use of a Y-shaped mixing tube etc. is recommended to accomplish bringing these aqueous solutions into contact. The following method is also recommended as a more convenient way of uniform contact. In a reaction vessel is put beforehand a small but stirrable volume of an alkali hydroxide aqueous solution containing an alkali metal salt. In order to suppress variation of pH during the reaction, the alkali hydroxide aqueous solution to be put first has a pH adjusted to 11 to 13. A cobalt (II) salt aqueous solution and an alkali hydroxide are fed into the reaction vessel at proper rates. By so doing, it is possible to bring the two solutions into uniform contact and mix them uniformly while suppressing variations in pH during the reaction.

The slurry temperature in which cobalt (II) hydroxide is formed is maintained at 40° C. or lower. If the slurry temperature is above 40° C., the formed cobalt (II) hydroxide is susceptible to oxidation even with an inert gas bubbled. While there is no preferred lower limit of the slurry temperature, temperatures above 0° C. are preferred because cooling more than necessary is nothing but wasteful.

Cobalt (II) hydroxide thus produced is collected by filtration, washed, freed of the water content by evaporation to dry, and then deagglomerated.

The filtration and washing are for the removal of by-products, unreacted materials, and excess of the alkali component. Residual by-products, unreacted materials or excess of the alkali component can adversely influence the blackness, electrical resistance, and the like of finally obtained cobalt-containing black pigment particulates.

The drying is preferably such that the dried product has a water content of 1% by mass or less. The water content of the dried product is controlled by appropriately adjusting the drying temperature and time. When a water content is more than 1% by mass, the particulates generate a large quantity of water vapor in the firing step, which reduces the firing efficiency. The water content is still preferably adjusted to 0.1% to 0.6% by mass.

It is important to deagglomerated the dried product with a water content adjusted to 1% by mass or lower. If not deagglomerated, it will result in subjecting agglomerated cobalt (II) hydroxide to the firing step described hereinafter, causing problems such as further agglomeration by firing and the like. Examples of preferred deagglomerating equipments include high-speed rotary grinders such as a hammer mill, an impact mill, and a disc mill.

The cobalt (II) hydroxide thus obtained is then fired in the atmosphere at 400° to 800° C. Unless the firing is in the atmosphere, the particulates do not transform into cobalt-containing black pigment particulates. At firing temperatures lower than 400° C., the transformation is insufficient, resulting in a failure to ensure high blackness and electrical resistance. At firing temperatures higher than 800° C., sintering among the particulates proceeds, causing not only increase of particle size but progress of cobalt oxidation during the firing, which can result in a reduced divalent cobalt content. A still preferred firing temperature ranges from 500° to 700° C.

The thus obtained cobalt-containing black pigment particulates may further be processed in a wheel type kneading machine having compressive, shearing, and spatulating effects to further increase electrical resistance. Yodo Mill available from Yodo Casting Co., Ltd. is exemplary of the wheel type kneading machine having compressive, shearing, and spatulating effects. The processing is preferably carried out under a linear pressure of 30 to 160 kgf/cm for 10 to 90 minutes. By this processing, the electrical resistance of the cobalt-containing black pigment particulates increases by about an order of magnitude. A still preferred linear pressure is 30 to 120 kgf/cm.

The resulting cobalt-containing black pigment particulates may further be processed by, for example, compounding with other materials to give a black pigment composition in the form of paste or slurry.

The other materials include resins, solvents, and, according to necessity, inorganic powders such as glass powder and additives such as adhesive paste, surface active agents, cure accelerators, and auxiliaries.

Examples of the resins that can be used include acrylic resins, polyester resins, polyurethane resins, epoxy resins, phenol resins, melamine resins, amino resins, vinyl chloride resins, silicone resins, rosin resins such as gum rosin and lime rosin, maleic acid resins, polyamide resins, nitrocellulose, ethylene-vinyl acetate copolymer resins, rosin-modified resins such as rosin-modified phenol resins and rosin-modified maleic acid resins, petroleum resins, water soluble acrylic resins, water soluble styrene-maleic acid resins, water soluble alkyd resins, water soluble melamine resins, water soluble urethane emulsion resins, water soluble epoxy resins, and water soluble polyester resins.

Examples of the solvent include toluene, xylene, thinners, butyl acetate, methyl acetate, methyl isobutyl ketone, methyl cellosolve, ethyl cellosolve, propyl cellosolve, butyl cellosolve, ester solvents such as ethyl acetate, butyl acetate and amyl acetate, aliphatic hydrocarbon solvents such as hexane, heptane and octane, alicyclic hydrocarbon solvents such as cyclohexane, petroleum solvents such as mineral spirit, ketone solvents such as acetone and methyl ethyl ketone, and water compatible solvents including alcohols such as methanol, ethanol, and propanol, glycols such as ethylene glycol and propylene glycol, glycol ethers such as propylene glycol monomethyl ether and propylene glycol monoethyl ether, and polar solvents such as 2-pyrrolidone, N-methylpyrrolidone, dimethylformamide, and dimethyl sulfoxide.

The composition may have the form of paste or slurry by adjusting the compounding ratio of the above-described components according to the application. While the compounding ratio of the components is not particularly limited, a recommended proportion of the black pigment based on the entire composition is 0.1% to 70% by mass, preferably 10% to 60% by mass.

Containing the cobalt-containing black pigment particulates with excellent blackness and high electrical resistance, the black pigment composition is suited for use as a color composition for black matrix formation.

EXAMPLE

The present invention will now be illustrated concretely by way of Examples, but it should be understood that the invention is not deemed to be limited thereto.

Example 1

In a 200 liter reaction vessel was put 80 liters of a sodium hydroxide aqueous solution having a pH of 12. Sixty liters of a cobalt (II) sulfate aqueous solution containing 1.2 mol/l of cobalt (II) was continuously fed to the reaction vessel at a rate of 1 l/min. At the same time, a 12 mol/l sodium hydroxide aqueous solution was continuously fed to the reaction vessel at a rate adjusted so that the pH of the slurry in the reaction vessel as continuously monitored might be 12. During the addition, the slurry temperature was maintained at 35° C., and nitrogen gas was always bubbled at a rate of 5 l/min. The amount of the 12 mol/l sodium hydroxide aqueous solution fed was 12 liters. After completion of the mixing, bubbling with nitrogen gas and stirring were continued for an additional 30 minute period.

The resulting cobalt (II) hydroxide slurry was filtered, and the solid was washed and dried at 80° C. to give dried cobalt (II) hydroxide having a water content of 0.5% by mass. The water content measurement was in accordance with JIS K5101-1991 (heat loss method). The dried cobalt (II) hydroxide was deagglomerated with a hammer mill to obtain powdered cobalt (II) hydroxide.

The powdered cobalt (II) hydroxide was fired in the atmosphere at 600° C. for 120 minutes to yield cobalt-containing black pigment particulates.

The resulting cobalt-containing black pigment particulates were evaluated as follows. The results of evaluation are shown in Table 1 below.

Method of Evaluation:

(a) Total Cobalt Content Based on the Entire Particulates

The cobalt-containing black pigment particulates were completely dissolved in an acid. The cobalt content of the solution was determined by ICP.

(b) Divalent Cobalt Content Based on the Entire Particulates and $Co^{2+}$/Total Co Ratio To 5.0 ml of a 0.5N ammonium iron (II) sulfate solution was added 0.1 g of a sample and completely dissolved with 20 ml of (1+1) hydrochloric acid. Ten milliliters of a 1:1 (by weight) mixture of concentrated sulfuric acid and phosphoric acid was added thereto, followed by dilution with water to adjust to 200 ml. The solution was titrated with a standard N/10 potassium dichromate solution using sodium diphenylaminesulfonate as an indicator to determine the iron (II) ion concentration in the solution.

The molar quantity of iron (II) ions in the sample solution was calculated from the iron (II) ion concentration determined by the titration and the volume of the sample solution. A difference between the molar quantity of iron (II) ions in the 0.5N ammonium iron (II) sulfate solution used above and that in the sample solution was taken as the molar quantity of iron (III) ions.

Because iron (III) ions are produced through the following chemical reaction, the molar quantity of iron (III) ions was regarded to be indicative of the molar quantity of cobalt (III) ions.

$$Co^{3+}+Fe^{2+}\rightarrow Co^{2+}+Fe^{3+}$$

The cobalt (III) ion molar quantity (mol) multiplied by 58.93 divided by 0.1 multiplied by 100 gives the cobalt (III) content (mass %) in the sample. The cobalt (II) content is then calculated from (total cobalt content−cobalt (III) content). The $Co^{2+}$/total Co ratio was obtained from [(cobalt (II) content/total cobalt content) multiplied by 100].

(c) Particle Shape and Size

The particulates were observed with a scanning electron microscope (×40,000). At this time, the Feret's diameter of arbitrarily chosen 200 particulates was measured, and the number mean was taken as a primary particle size.

(d) Electrical Resistivity

A sample weighing 10 g was put into a holder and compressed under a pressure of 600 kgf/cm$^2$ into a 25 mm diameter tablet. Electrodes were attached to the tablet, and resistance was measured under a pressure of 150 kgf/cm$^2$. The resistivity was calculated from the thickness and cross-sectional area of the tablet and the measured resistance.

(e) Blackness and Hue

The blackness and hue of the powder were evaluated in accordance with JIS K5101-1991.

A sample weighing 2.0 g was kneaded with 1.4 cc of castor oil in a Hoover automatic muller. The resulting paste (2.0 g) was further kneaded with 7.5 g of a lacquer, followed by further kneading. The resulting material was applied to mirror coat paper with a 4-mil applicator, dried, and measured for blackness (L value) and hue (a value and b value) with a color analyzer (Color Analyzer TC-1800 available form Tokyo Densyoku Co., Ltd.).

(f) Tinting Strength (Spreadability as Dispersion or Coating)

To a mixture of 0.5 g of black particulates and 1.5 g of titanium oxide (R800 available from Ishihara Sangyo Kaisha, Ltd.) was added 1.3 cc of castor oil, and the mixture was kneaded in a Hoover automatic muller. To the resulting paste (2.0 g) was added 4.5 g of a lacquer, followed by further kneading. The resulting paste was applied to mirror coat paper with a 4-mil applicator, dried, and measured for tinting strength (L value, a value, and b value) with a color analyzer (Color Analyzer TC-1800 available form Tokyo Densyoku Co., Ltd.).

(g) Specific Surface Area

Measured with a BET surface area analyzer (Shimadzu-Micromeritex Model 2200).

(h) Oil Absorption

Measured in accordance with JIS K5101-1991.

Example 2

Particles were obtained in the same manner as in Example 1, except that firing was conducted at 750° C. The resulting particulates were evaluated in the same manner as in Example 1. The results obtained are shown in Table 1.

Example 3

Particles were obtained in the same manner as in Example 1, except that pH of the system for cobalt hydroxide formation was adjusted to 11.2. The resulting particulates were evaluated in the same manner as in Example 1. The results obtained are shown in Table 1.

Example 4

The black pigment obtained in Example 1 was treated in Yodo Mill (from Yodo Casting Co., Ltd.) under a linear pressure of 40 kgf/cm for 30 minutes. The resulting particulates were evaluated in the same manner as in Example 1. The results obtained are shown in Table 1.

Comparative Example 1

Particles were obtained in the same manner as in Example 1, except that the firing was conducted at 300° C. The resulting particulates were evaluated in the same manner as in Example 1. The results obtained are shown in Table 1.

Comparative Example 2

Particles were obtained in the same manner as in Example 1, except for changing the neutralization slurry temperature to 50° C. during the formation of cobalt (II) hydroxide. The resulting particulates were evaluated in the same manner as in Example 1. The results obtained are shown in Table 1.

Comparative Example 3

Particles were obtained in the same manner as in Example 1, except for using 9.0 liters of 28% aqueous ammonia as an alkali for the formation of cobalt (II) hydroxide. The resulting particulates were evaluated in the same manner as in Example 1. The results obtained are shown in Table 1.

TABLE 1

| | Component | | | | Characteristic Values | | | | | | | | |
|---|---|---|---|---|---|---|---|---|---|---|---|---|---|
| | T-Co | Co$^{2+}$ | Co$^{2+}$/T-Co | | Mean Particle Size | BET Specific Surface Area | Electrical Resistivity | Oil Absorption | Color analysis | | | | | |
| | | | | | | | | | Tinting strength | | | Blackness | | |
| | (mass %) | (mass %) | (%) | Shape | (μm) | (m$^2$/g) | (Ωcm) | (ml/100 g) | L | a | b | L | a | b |
| Example 1 | 71.9 | 35.3 | 49.1 | particulate | 0.21 | 10.8 | 5.7 × 10$^7$ | 30 | 35.2 | 0.0 | −1.5 | 21.5 | −0.3 | 0.4 |
| Example 2 | 69.9 | 29.7 | 42.5 | particulate | 0.29 | 6.3 | 1.7 × 10$^8$ | 26 | 36.5 | −0.3 | −1.8 | 22.3 | −0.4 | 0.2 |
| Example 3 | 72.4 | 44.7 | 61.7 | particulate | 0.15 | 20.9 | 8.7 × 10$^5$ | 37 | 34.5 | 0.4 | −0.8 | 20.8 | 0.2 | 0.7 |
| Example 4 | 71.2 | 37.0 | 52.0 | particulate | 0.21 | 10.5 | 4.1 × 10$^8$ | 21 | 34.8 | 0.2 | −1.3 | 20.9 | 0.0 | 0.5 |
| Compara. Example 1 | 69.5 | 50.3 | 72.4 | platy | 0.35 | 35.6 | 6.2 × 10$^4$ | 45 | 33.7 | 0.6 | 1.0 | 21.6 | 0.2 | 1.1 |
| Compara. Example 2 | 68.1 | 22.5 | 33.0 | particulate | 0.25 | 13.2 | 3.8 × 10$^4$ | 29 | 38.4 | 1.0 | 1.5 | 23.5 | 0.5 | 1.5 |
| Compara. Example 3 | 72.3 | 27.5 | 38.0 | platy | 1.20 | 12.2 | 2.3 × 10$^8$ | 14 | 45.0 | −1.5 | −2.2 | 22.4 | −1.5 | −2.4 |

As is apparent from Table 1, the cobalt-containing black pigment particulates of Examples 1 to 4 exhibit excellent blackness and high electrical resistance and are therefore superior as a material of color compositions forming a black matrix and black electrodes, light shield layers, etc. of plasma displays, plasma addressed liquid crystal displays, and the like.

The SEM photograph of the cobalt-containing black pigment particulates of Example 1 is shown in FIG. 1. The particulates obtained in Example 1 were a particulate form.

In contrast, the particulates of Comparative Example 1 had a divalent cobalt content as high as 72.4% based on the total cobalt and a platy shape and therefore had a poor hue particularly with a high b value. Besides, the particulates of Comparative Example 1 had low electrical resistivity. The particulates of Comparative Example 2, on the other hand, had a divalent cobalt content as low as 33.0% based on the total cobalt, proving to have the composition of tricobalt tetroxide. While particulate, they are inferior to the particulates of the invention in blackness on account of their low divalent cobalt content. The particulates of Comparative Example 3 had a platy shape and a large particle size. While excellent in blackness and hue, they have low tinting strength, i.e., poor performance as a pigment.

INDUSTRIAL APPLICABILITY

As described, the cobalt-containing black pigment particulates of the present invention exhibit excellent blackness and high electrical resistance and are therefore suited for black pigment in black electrodes or light shield layers of plasma displays, plasma addressed liquid crystal displays, and so on.

The invention claimed is:

1. Cobalt-containing black pigment particulates comprising an oxide containing at least cobalt and having a divalent cobalt content of 40% to 70% based on the total cobalt content.

2. The cobalt-containing black pigment particulates of claim 1, having a total cobalt content of 60% to 80% by mass based on the entire particulates and a divalent cobalt content of 25% to 50% by mass based on the entire particulates.

3. The cobalt-containing black pigment particulates of claim 1, having a primary particle size of 0.02 to 0.6 μm.

4. The cobalt-containing black pigment particulates of claim 1, wherein the particulates are spheres or spindles.

5. The cobalt-containing black pigment particulates of claim 1, wherein the particulates do not have platy shapes.

6. The cobalt-containing black pigment particulates of claim 1, having a total cobalt content of 65% to 75% by mass based on the entire particulates and a divalent cobalt content of 25% to 45% by mass based on the entire particulates.

7. The cobalt-containing black pigment particulates of claim 1, having a primary particle size of 0.05 to 0.3 μm.

8. The cobalt-containing black pigment particulates of claim 1, wherein the particulates have a blackness L value of 38 or smaller and a hue b value of 0 or smaller.

9. The cobalt-containing black pigment particulates of claim 1, wherein the particulates have a blackness L value of 36 or smaller and a hue b value of −0.5 or smaller.

10. The cobalt-containing black pigment particulates of claim 1, wherein the particulates have an electrical resistivity of $1\times10^5$ Ωcm or higher.

11. The cobalt-containing black pigment particulates of claim 1, wherein the particulates have an electrical resistivity of $1\times10^6$ Ωcm or higher.

12. The cobalt-containing black pigment particulates of claim 1, wherein the particulates additionally contain at least one element selected from the group consisting of Si, Al, Mn, Ni, Zn, Cu, Mg, Ti, Zr, W, Mo and P.

13. A black pigment composition containing the cobalt-containing black pigment particulates of claim 1.

* * * * *